United States Patent
Rostron

(10) Patent No.: US 8,717,721 B2
(45) Date of Patent: May 6, 2014

(54) HIGH IMPEDANCE FAULT ISOLATION SYSTEM

(75) Inventor: Joseph R. Rostron, McDonough, GA (US)

(73) Assignee: Southern States, LLC, Hampton, GA (US)

( * ) Notice: Subject to any disclaimer, the term of this patent is extended or adjusted under 35 U.S.C. 154(b) by 113 days.

(21) Appl. No.: 13/217,318

(22) Filed: Aug. 25, 2011

(65) Prior Publication Data

US 2013/0050882 A1 Feb. 28, 2013

(51) Int. Cl.
*H02H 3/08* (2006.01)

(52) U.S. Cl.
USPC .......................................................... 361/44

(58) Field of Classification Search
USPC .......................................................... 361/44
See application file for complete search history.

(56) References Cited

U.S. PATENT DOCUMENTS

| | | | |
|---|---|---|---|
| 6,373,670 B1 * | 4/2002 | Bo | 361/81 |
| 2003/0055585 A1 * | 3/2003 | Stoupis et al. | 702/58 |
| 2004/0196603 A1 * | 10/2004 | Schweitzer et al. | 361/62 |

* cited by examiner

*Primary Examiner* — Jared Fureman
*Assistant Examiner* — Kevin J Comber
(74) *Attorney, Agent, or Firm* — Michael J. Mehrman; Mehrman Law Office

(57) ABSTRACT

A high impedance fault isolation system for a radially connected three phase electric power line that utilizes three phase current measurements to determine the presence of a fault without the need for any voltage measurements or a battery powered controller. This eliminates the need for costly phase voltage measuring devices conventionally required to detect high impedance faults, which makes it economical to install fault isolation system at a greater number of locations throughout the power system. The system detects faults using current measurements by computing the negative and zero sequence current components and comparing the amplitudes of the negative and zero sequence components. A fault is detected when the ratio of the amplitudes of the negative and zero sequence components falls within a predefined fault detection range, such as the range from 0.5 to 1.5.

8 Claims, 4 Drawing Sheets

HIGH IMPEDANCE FAULT ISOLATION SYSTEM

TECHNICAL FIELD

The present invention relates to electric power systems and, more particularly, relates to a high impedance fault isolation system for a radially connected three phase electric power line that does not require phase voltage measurements.

BACKGROUND OF THE INVENTION

Faults in electric power systems occur for a variety of reasons, such as trees or cranes coming into contact with power lines, transformer failure, shorts in load circuits, and so forth. Once the line section experiencing the fault has been identified, sectionalizing switches are used to isolate the faulted line segment in order to bring the non-faulted sections back into service. Detecting and locating faults on a power system is therefore essential for public safety as well as minimizing the extent of outages caused by line faults and providing high quality service to the users of electric power. Line mounted overcurrent fault indicators commonly utilized on distribution circuits in urban environments identify faults by detecting high fault currents that significantly exceed normal load currents. These work quite well when there is a solidly grounded, low impedance fault that causes the line currents to increase by 2 to 10 times the load current.

While overcurrent protection devices are effective at detecting the high fault currents caused by low impedance faults, it is much more difficult to detect high impedance faults in which the fault currents are in the approximate range of normal load currents. For these types of high impedance faults, the normal load currents mask the fault currents preventing the overcurrent line monitors from detecting the faults. Techniques have been developed for detecting high impedance faults using three phase voltages and currents, but these systems are costly and typically do not have sufficient distance resolution to effectively determine fault location.

While three phase current monitors are relatively inexpensive, it is generally not economically feasible to install three phase voltage monitors at various points along distribution lines where the high impedance faults usually occur. Because three phase voltage are required, high impedance fault detection systems are typically installed only at substations where these measurements are readily available. This results in an entire radial distribution line, from the substation to the end of the power line, typically being taken out of service until the high impedance fault has been cleared. Of course, in most cases the fault actually occurs far from the substation and a large portion of the radial power line between the substation and the fault could remain in service if fault detection and isolation systems capable of detecting high impedance faults were located at various points along the distribution line. But at present this is not economically feasible due to the high cost of installing three phase voltage monitoring equipment at various points along distribution lines.

Techniques have been developed for detecting high impedance faults by identifying signatures created by arcing faults. But these techniques require complex algorithms and are prone to false detection caused by parasitic harmonic content on power lines. In addition, their reliability can be suspect because they require batteries at line voltage which are difficult to replace and have finite lifetimes.

There is also a misconception that sensitive ground protection typically used to detect low ground current will detect high impedance faults. But in reality, unbalanced loads limit the sensitivity of ground protection. Moreover, a down conductor can result in relatively balanced fault loads and reduced neutral current.

This can easily mislead the protection equipment into failing to detect a high impedance fault. Significant safety issues can result, for example when a tree or crane comes into contact into a power line and the people in the immediate surrounding area are in grave danger. The conventional overcurrent protection devices have great difficulty in detecting a fault of this type due to the high impedance, low current nature of the fault. As a result, the time duration between occurrence of the fault and its detection by the system operators can easily be minutes to days. In some cases, the fault may not be identified until panic 911 calls have been received from the general public notifying the utility company to turn off the power.

There is, therefore, a continuing need for improved and more cost effective electric power fault isolation systems for high impedance faults. There is, in particular, a need for a high impedance fault isolation system that does not require voltage measurements. There is a further need for a high impedance fault isolation system that does not require battery powered controller.

SUMMARY OF THE INVENTION

The present invention meets the needs described above in a high impedance fault isolation system for a radially connected three phase electric power line that utilizes three simultaneously obtained phase current measurements to determine the presence of a fault without the need for any voltage measurements. As an additional option, the system may be configured to operate without a battery powered controller, relying instead on "scavenged" power inductively received from the associated power line. The highly high impedance fault isolation system eliminates the need for phase voltage measuring devices conventionally required to detect high impedance faults, making it economical to install at a greater number of locations throughout the power distribution system. High impedance faults are detected using three simultaneously, inductively obtained phase current measurements. The negative and zero sequence current components are computed for each phase. A fault is detected when the ratio of the amplitudes of the negative and zero sequence components for any phase current falls within a predefined fault detection range, for example in the range of about 0.5 to 1.5.

The high impedance fault isolation system includes a current measuring device (CMD) producing three simultaneous phase current measurements for a monitored line segment. As an option, the CMD may operate without a battery powered controller, relying instead on "scavenged" power inductively received from the associated power line, which is particularly useful for monitoring points outside substation. Nevertheless, the inventive fault detection controller may also be practiced with conventional CTs having battery powered controllers, which are normally located in substations. A fault detection controller computes negative and zero sequence current components for each phase based on the three phase current measurements and a ratio between the amplitudes of the negative and zero sequence current components for each phase. The fault detection controller detects a high impedance fault on a phase when the ratio between the amplitudes of the negative and zero sequence current components for that phase falls within the predefined fault detection range. The fault detection controller then activates response equipment in response to determining a high impedance fault, such as a switch configured to disconnect the line segment from the power grid or communication equipment configured to report the high impedance fault condition to a remote location that operates the switch based on a comprehensive fault isolation scheme that takes the fault detection results of multiple monitoring points into consideration.

In view of the foregoing, it will be appreciated that the present invention provides an improved high impedance fault isolation system for a three phase electric power circuit. The specific structures and techniques for accomplishing the advantages described above will become apparent from the following detailed description of the embodiments and the appended drawings and claims.

DETAILED DESCRIPTION OF THE EMBODIMENTS

Figure 1:
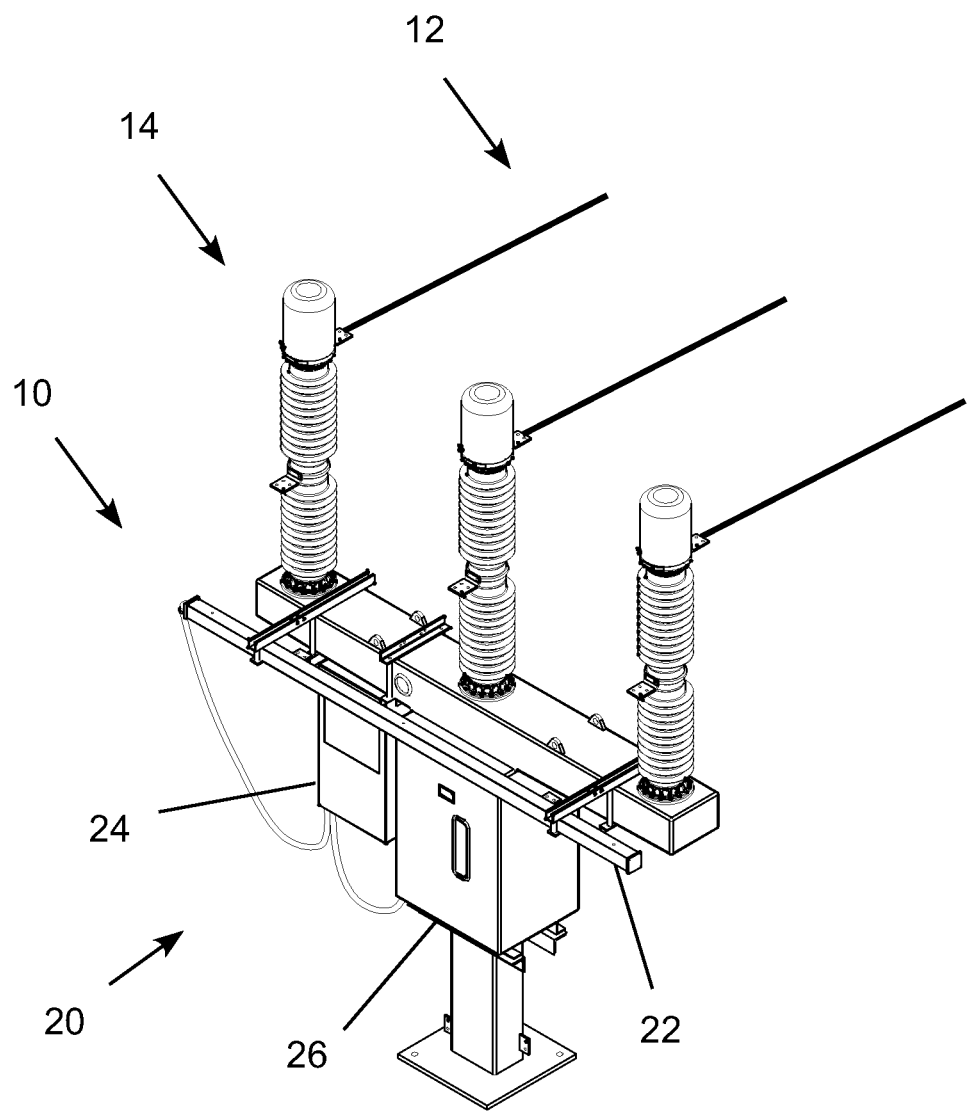
FIG. 1 is a perspective view of a high impedance fault isolation system.

The present invention may be embodied as a high impedance fault isolation system for a radially connected three phase power line that utilizes three simultaneous phase current measurements to detect a high impedance fault. There is a relationship that exists between the phase currents that can be utilized to detect high impedance faults. In classic power system analysis, each phase current can be broken down into components known as the positive, negative, and zero sequence currents. These components are phasors that can be readily computed directly from three phase current measurements obtained for the same point in time. The high impedance fault detection system identifies a fault when the ratio of the amplitudes of the negative and zero sequence components for any phase falls within a predefined fault detection range, such as the range from 0.5 to 1.5.

The use of a ratio of the amplitudes of sequence currents to detect high impedance faults is the novel approach here. The ratio of the amplitudes of the negative to zero sequence currents under a fault condition is theoretically 1.0. In actual environments, however, the ratio for high impedance faults falls in the approximate range of 0.5 to 1.5. The use of this ratio in finding high impedance faults has not been considered or implemented in any prior approach to finding high impedance faults. The unique property is that when the ratio falls below this range there is no fault, and when the ratio falls above this range the power line has experienced a low impedance fault that can be reliably detected with ordinary overcurrent detection equipment. But when the ratio falls within this range, there exists a high impedance fault that will likely elude detection by the ordinary overcurrent detection equipment, which can be a very dangerous situation.

The high impedance fault detection technique described above has been found to be very reliable for radial fed power lines and also reliable for loop fed power lines, such as transmission lines, once a fault has been identified and one or more breakers have tripped turning the circuit into a radial mode. It is standard practice to clear a fault at all points connected to a detected fault and then close switches one at a time to narrow in on the location of the fault. This is called a reclosing operation. While the substation relays know that there is a fault, their ability to pinpoint the location of the fault is rather limited in complex networks with multiple branches. The placement of the high impedance fault detection systems at various monitoring points along a line or throughout the distribution network can easily identify these high impedance faults where ordinary overcurrent devices simply don't work because the fault currents are masked by the normal load currents.

Obtaining three phase current measurements for the same point in time is the essential ingredient for computing the sequence current components. Some current monitoring devices placed along power lines utilize single phase current measurements and hence cannot determine the presence of high impedance faults through sequence current analysis because they do not obtain all three phase current measurements on the same time basis. Other techniques using simultaneously voltage and current measurements could be used at various locations along power lines but this approach is more costly to implement as each measurement point needs three phase voltage and current measurements in real time and the intelligence to identify high impedance faults. The present system, on the other hand, uses only inductively measured phase currents to compute the negative and zero sequence current components, and then compares the amplitudes of those components to detect high impedance faults.

The present invention allows multiple high impedance fault isolation systems to be economically located at various points along a power line and throughout the distribution system. These fault isolation systems can then be used to pinpoint and isolate line segments experiencing high impedance faults so that the non-faulted segments can be reenergized. While the same sectionalizing techniques used by conventional overcurrent protection systems can be employed to isolate the faulted line segments, the present system effectively detects high impedance faults that elude detection by conventional overcurrent devices. This approach has the added benefit of not experiencing false positives because of parasitic harmonics that can cause arc detection system to experience false positives.

The invention provides an economical system for isolating high impedance faults in the middle of the power system network. The economics come from avoiding the use of costly voltage measurements of individual phase voltages in the middle of power or distribution lines. The system also avoids complex harmonic wave form signature analysis used in arcing fault detection systems. Furthermore, the present system is not confused by parasitic characteristics of networks and does not rely on battery powered controllers maintained at line potential, which subjects them to unexpected and outages and makes changing the batteries difficult. In the present system, the phase current measurements are obtained by an inductive current monitoring device that does not require voltage measurements or a battery powered controller. The result is an easily implementable solution with current sensors that measure phase current simultaneously and simple calculations by a device receiving all their information in real time.

FIG. 1 is a perspective view of a high impedance fault isolation system 10 for a three phase electric power line 12, which is supported by a set of insulators 14. The isolation system includes a current monitoring device (CMD) 20 and response equipment 26 controlled directly or indirectly by the CMD. The CMD includes a current sensing wand 22 and a CMD controller 24. The CMD is described in greater detail in U.S. Pat. Nos. 7,191,074 and 7,683,798, which are incorporated by reference. It should be appreciated that the CMD operates using induced currents obtained from the monitored power line and therefore does not require a battery or other power source to operate. The high impedance fault isolation system 10 therefore operates whenever the power line 12 is energized without relying on another power source, such as battery.

Figure 2:
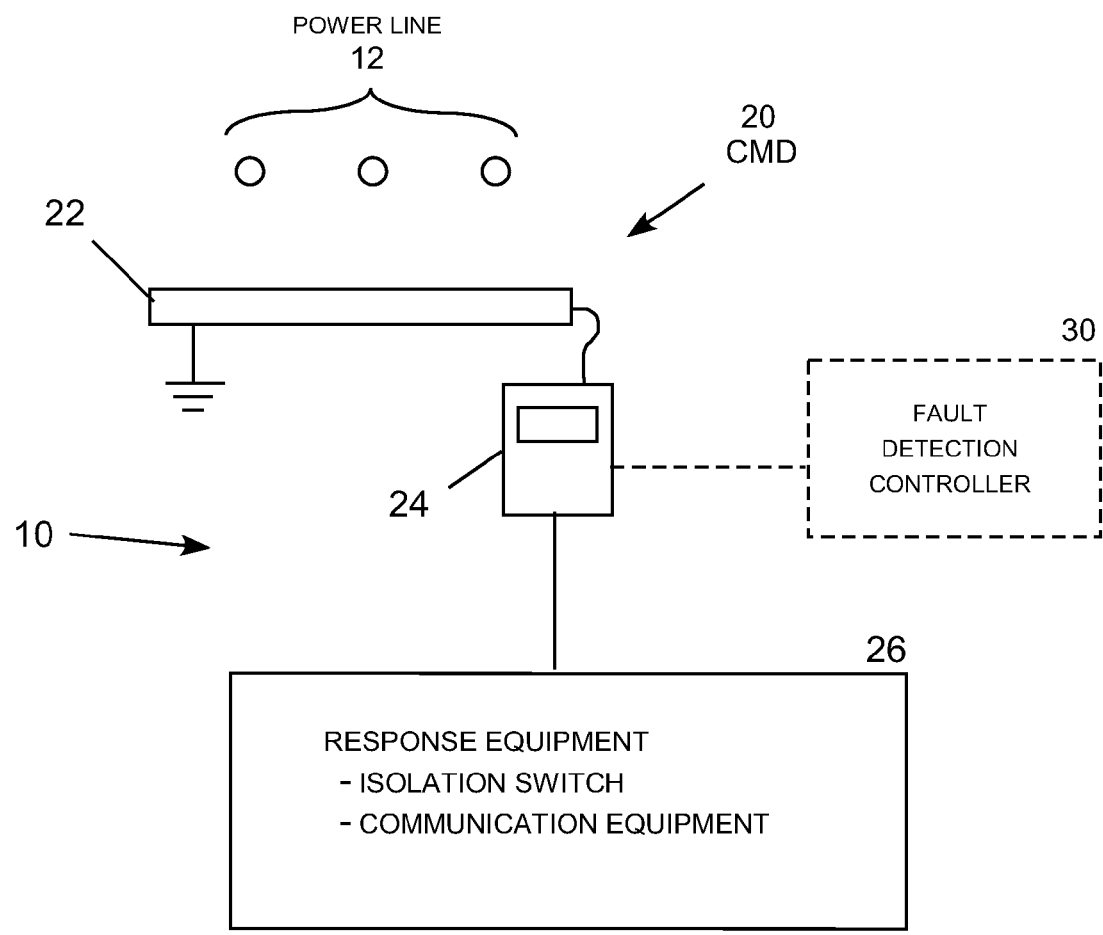
FIG. 2 is schematic diagram of the high impedance fault isolation system.

FIG. 2 is schematic diagram of the high impedance fault isolation system 10. The CMD controller 24 includes a fault detection controller 30 typically implemented by a microprocessor and associated software. The CMD controller detects the high impedance faults and controls the response equipment 26, which includes a sectionalizing switch that disconnects the power line 12 from the power grid. The sectionalizing switch may be directly controlled by the CMD or the CMD may operate communication equipment that transmits notice of a detected fault to a remote location that, in turn, operates the sectionalizing switch based on a comprehensive fault isolation scheme that takes the fault detection results of multiple monitoring points into consideration. In either case, the operation of the high impedance fault isolation system 10 may result in operation of the sectionalizing switch, which is part of the response equipment 26, to isolate the power line from the power grid in response to a detected fault on the power line.

Figure 3:
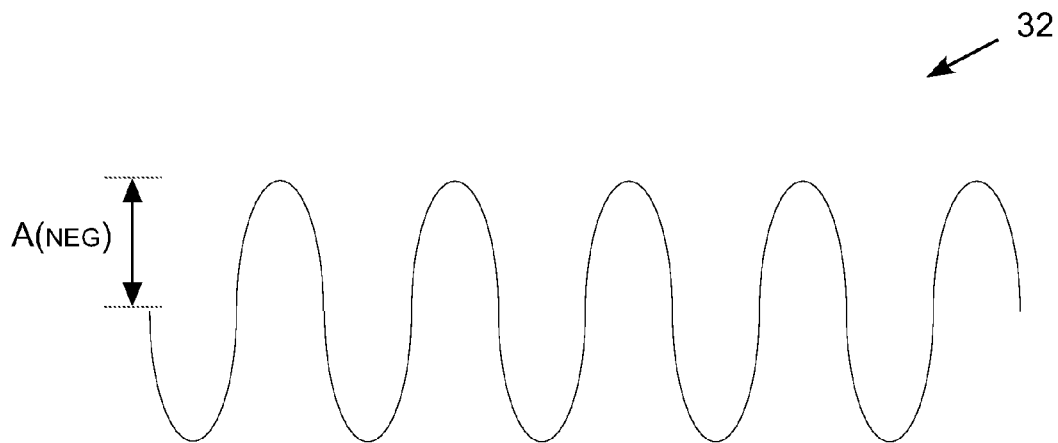
FIG. 3 is conceptual illustration of a negative sequence current component computed by the high impedance fault isolation system.
Figure 4:
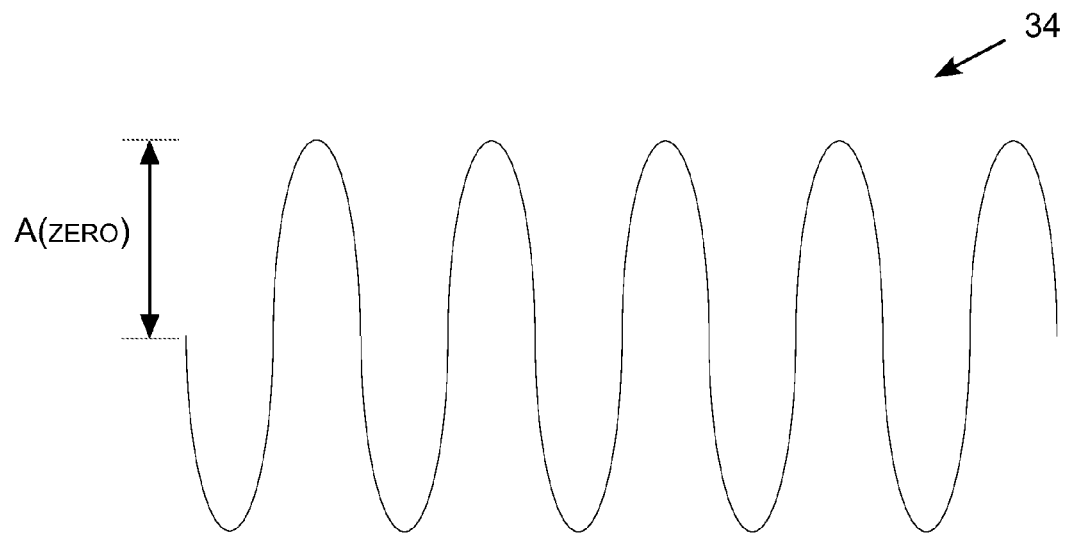
FIG. 4 is conceptual illustration of a zero sequence current component computed by the high impedance fault isolation system.

The fault detection controller 30 detects the high impedance faults using three simultaneously obtained phase current measurements by computing the negative and zero sequence current components for each phase and comparing the amplitudes of the negative and zero sequence components. FIG. 3 is conceptual illustration of the negative sequence current component 32 with the amplitude A(NEG) shown. Similarly, FIG. 4 is conceptual illustration of the zero sequence current component 34 with the amplitude A(ZERO) shown. The fault detection controller 30 detects faults detected when the ratio of the amplitudes of the negative and zero sequence components for any phase falls within a predefined fault detection range, such as the range from 0.5 to 1.5, as shown below:

$$\text{Fault Detection Range}=0.5 < A(NEG)/A(ZERO) < 1.5$$

Those skilled in the art will appreciate that the fault detection range shown above is illustrative and may be varied somewhat within the teaching of the invention. In addition, faults in which the ratio shown above is greater than 1.5 do not necessarily indicate a high current fault, as motor starting currents and other normal operating events can result in ratios above 1.5. A ratio below 0.5 generally indicates that no fault has occurred.

Figure 5:
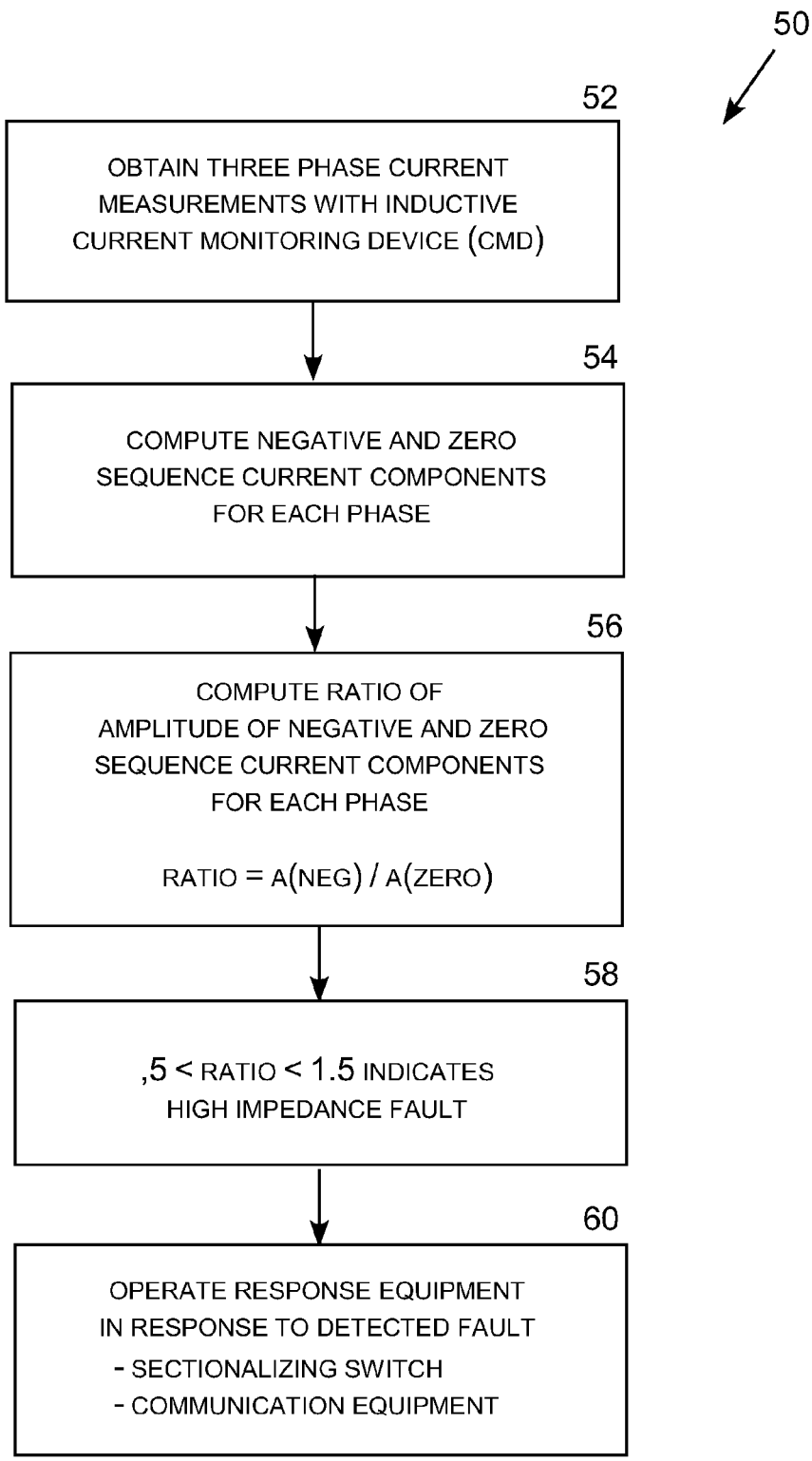
FIG. 5 is logic flow diagram for the high impedance fault isolation system.

FIG. 5 is logic flow diagram illustrating a routine 50 for operating the high impedance fault isolation system. In step 52, the system obtains three phase current measurements for the same monitoring time point through the inductive current sensors of the CMD. Step 52 is followed by step 54, in which the system computes the negative and zero sequence components for each phase current. Step 54 is followed by step 56, in which the system computes the ratio of the amplitude of the negative sequence current component to the amplitude of the zero sequence current component for each phase current. Step 56 is followed by step 58, in which the system detects a fault if the ratio of the amplitudes the negative and zero sequence components for any phase is within a high impedance fault detection range, typically the range of 0.5 to 1.5. Step 58 is followed by step 60, in which the system operates response equipment in response to a detected fault. This typically involves directly activating a sectionalizing switch to isolate the power line from the power grid, or operating communication equipment to report the detected fault to a remote location that may indirectly operate the sectionalizing switch based on a comprehensive fault isolation scheme that takes the fault detection results of multiple monitoring points into consideration.

Those skilled in the art will appreciate that the foregoing describes preferred embodiments of the invention and that many adjustments and alterations will be apparent to those skilled in the art within the spirit and scope of the invention as defined by the appended claims.

The invention claimed is:

1. A high impedance fault isolation system for a radially connected three phase electric power line segment connected to a power grid, comprising:
   a current measuring device producing three simultaneous phase current measurements for the line segment; and
   a fault detection controller operative to:
   compute negative and zero sequence current components for each phase based on the three phase current measurements;
   compute a ratio between the amplitudes of the negative and zero sequence current components for each phase;
   detect a high impedance fault on a phase when the ratio between the amplitudes of the negative and zero sequence current components for that phase falls within a predefined fault detection ratio range; and
   activate response equipment in response to determining a high impedance fault.

2. The high impedance fault isolation system of claim 1, wherein the predefined fault detection ratio range is approximately 0.5 to 1.5.

3. The high impedance fault isolation system of claim 1, wherein the response equipment comprises a switch to disconnect the line segment from the power grid.

4. The high impedance fault isolation system of claim 1, wherein the response equipment comprises communication equipment configured to report the high impedance fault condition to a remote location configured to operate a switch to disconnect the line segment from the power grid.

5. A method for isolating a radially connected three phase electric power line segment experiencing a high impedance fault from a power grid, comprising:
   obtaining three simultaneous phase current measurements for the line segment;
   computing negative and zero sequence current components for each phase based on the three phase current measurements;
   computing a ratio between the amplitudes of the negative and zero sequence current components for each phase;
   detecting a high impedance fault on a phase when the ratio between the amplitudes of the negative and zero sequence current components for that phase falls within a predefined fault detection ratio range; and
   activating response equipment in response to determining a high impedance fault.

6. The method of claim 5, wherein the predefined fault detection ratio range is approximately 0.5 to 1.5.

7. The method of claim 5, wherein the step of activating response equipment further comprises activating a switch to disconnect the line segment from the power grid.

8. The method of claim 5, wherein the step of activating response equipment further comprises activating communication equipment configured to report the high impedance fault condition to a remote location configured to operate a switch to disconnect the line segment from the power grid.

\* \* \* \* \*